April 14, 1964 E. ROGAL 3,129,321

DATA COLLATING SYSTEM

Filed Jan. 26, 1960 2 Sheets-Sheet 1

INVENTOR
Edward Rogal
BY Morse & Altman
ATTORNEYS

INVENTOR
Edward Rogal
BY Morse & Altman
ATTORNEYS

United States Patent Office 3,129,321

Patented Apr. 14, 1964

3,129,321

DATA COLLATING SYSTEM

Edward Rogal, North Scituate, Mass., assignor to Universal Controls, Inc., New York, N.Y., a corporation of Maryland Filed Jan. 26, 1960, Ser. No. 4,647

4 Claims. (Cl. 235—61.7)

The present invention relates to data processing and, more particularly, to the collating of separate source data into combined summary data. For example, the present invention may be applied to department store accounting wherein it is desired to collate entries from separate entries for the purpose of preparing periodic bills. Or the present invention may be applied to bank accounting wherein it is desired to collate deposits and withdrawals for the purpose of preparing periodic statements.

The primary object of the present invention is to provide a novel automatic collating system that is characterized by simple construction and reliable operation by virtue of a particular association of data coding and switching. The data coding takes the form of representing data increments by selected frequencies which may be transmitted together at once and may be distinguished from each other by suitable filter. The switching is such as to program the operation of a plurality of source media in such a way as to collate and process the data therefrom and to produce a consolidated summary thereof. The system of the present invention is particularly useful in conjunction with a system disclosed in the copending application of Edward Rogal, Serial No. 784,913, filed January 5, 1959, for "Central Office Massive Memory Recording System."

Other objects of the present invention will in part be obvious and will in part appear hereinafter.

The invention accordingly comprises the apparatus possessing the construction, combination of elements and arrangement of parts, which are exemplified in the following detailed disclosure, the scope of which will be indicated in the appended claims.

For a fuller understanding of the nature and objects of the present invention, reference should be had to the following detailed description taken in connection with the accompanying drawings wherein.

Figure 1:
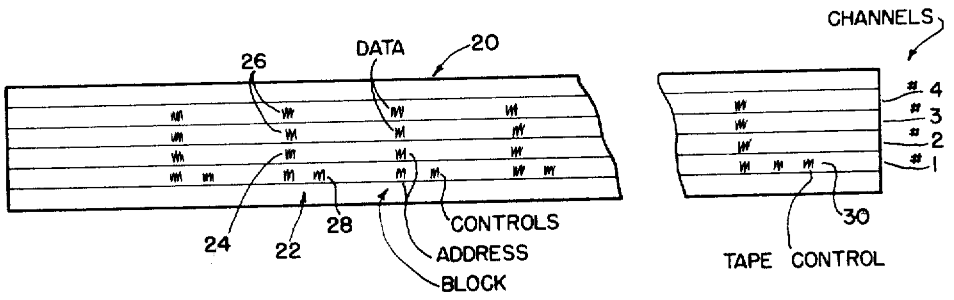
FIG. 1 is an explanatory diagram illustrating the coding technique of the disclosed system.

Generally, in the illustrated system, certain of the signals representing information being transferred are in the form of frequencies that may be transferred to and from suitable storage media. It is apparent that ten digits may be represented as ten different frequencies. In other words, any individual digit from 0 to 9 of a first decimal column or order of a multi-digit number or field may be represented by one of ten frequencies, any individual digit from 0 to 9 of a second decimal column or order may be represented by one of ten other frequencies, etc. All of these frequencies may be combined for transmission at one time while retaining their identities for separation by suitable discriminating circuits. The illustrated system will be described in reference to a sequence of specific groups or fields of digits, which fields are intended to represent all relevant information of a given commercial transaction. Certain increments of each of these fields constitute an address by which related groups on different storage media may be collated and certain other increments represent mathematical entries involved in any given transaction. The illustrated storage media are in the form of magnetic tapes in association with electromagnetic transducers or transfer heads. The magnetic tapes may be composed, for example, of powdered iron oxide dispersed in a suitable synthetic organic polymer. Each of the transducers, for example, is in the form of a minute iron horseshoe having a winding capable of producing magnetic induction in its gap in one direction or the other in accordance with an applied signal. Such a signal produces an induced magnetic state in an increment of the magnetic tape located in contiguity with the transducer gap when the signal occurs. Conversely, a signal is generated in the transducer winding by this magnetic state when the magnetic tape and the transducer are moved in contiguity relative to one another.

In the illustrated embodiment of the present invention, the data to be collated is recorded on a plurality of magnetic tapes of the types described above, one of which is shown at 20 in FIG. 1. Sequentially disposed along tape 20 are recorded blocks 22 including two address increments 24, two data increments 26, a block control increment 28 and a tape control increment 30. Address increments 24 and data increments 26 are disposed transversely across tape 20 respectively in longitudinal channels #1, #2, #3, and #4. Control increment 28 is disposed in a sequential position spaced from the first address increments 24 in channel #1. Channels #1, #2, #3 and #4 are operatively associated with corresponding transducers that constitute part of the system to be described below. Any one of the four increments designated 24 and 26 includes two superposed frequencies, the first of which is selected from a group of ten, designated "$f_0$–$f_9$," and the second of which is selected from a group of ten designated "$f_{10}$–$f_{19}$." In other words, the increment in any one of channels #1, #2, #3 and #4 is composed of two superposed frequencies designated as above. Block control increment 28, designated "$fx$" and tape control increment 30, designated "$f_t$," are different from the frequencies of the data and address increments and are capable of actuating control components of the system to be described below. Any convenient arrangement of the transducers with respect to tape 20 may be employed. For example, the legs of a transducer may be disposed along a line transverse with respect to tape 20 in such a way that an alternating frequency between the legs generates a corresponding record on any given channel of the tape as it advances.

In the illustrated embodiment, address increments 24 represent a particular account number, for example, a customer's account number, and data increments 26 represent particular account entry, for example, a customer's purchase entry. The purpose of the system now to be described is to gather from a plurality of source tapes (in this case two) a list of entries, to process this list of entries and to record this list of entries together with the processing results. Thus, for example, the accounting entries made at various locations during the course of an accounting period in association with a particular customer's order number may be collated and totalized at the end of the accounting period for billing purposes.

Figure 2:
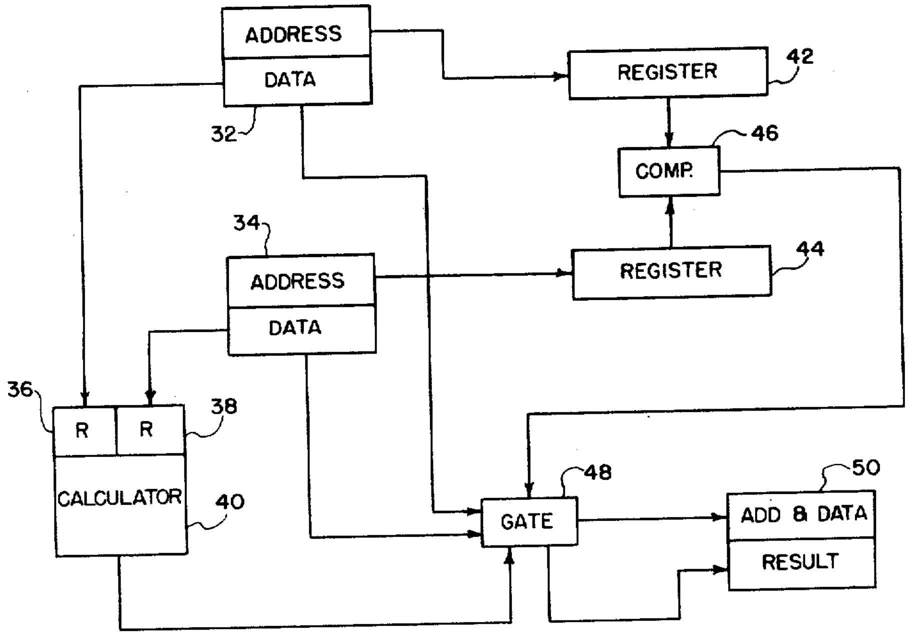
FIG. 2 is a block diagram of a system embodying the present invention.

As shown in FIG. 2, the illustrated system comprises a pair of source stations 32 and 34 for producing signals corresponding to the records on a pair of magnetic tapes of the type shown at 20 in FIG. 1, a pair of registers 36 and 38 in association with a calculator 40 for receiving data increments of the signals from source stations 32 and 34 and performing calculations thereupon in order to produce a signal representing a result, a pair of registers 42 and 44 in association with a comparator 46 for permitting registers 36 and 38 and calculator 40 to operate when signals representing like addresses are being generated by source stations 32 and 34, a gate 48 for permitting the passage of the signals from source stations 32 and 34 and calculator 40 in response to signals from comparator 46, and a summary station 50 for producing a record representing signals transmitted through gate 48 from source stations 32 and 34 and calculator 40. In operation, first, source station 34 reads a block of its tape in such a way that signals representing address increments are applied to register 44 and signals representing data increments are applied to register 38. Next, source station 32 reads successive blocks of its tape in such a way that for any given block, signals representing address increments are applied to register 42 and signals representing data increments are applied to register 36. Next, registers 42 and 36 are operated in sequence without effect on the remainder of the system until the address increments of a particular block read by source station 32 correspond to the address increments of the particular block read by source station 34. At this time, comparator 46 operates and signals representing the address and data increments of the blocks read by source stations 32 and 34 and the results produced by calculator 40 are transmitted through gate 48 to summary station 50.

Figure 3:
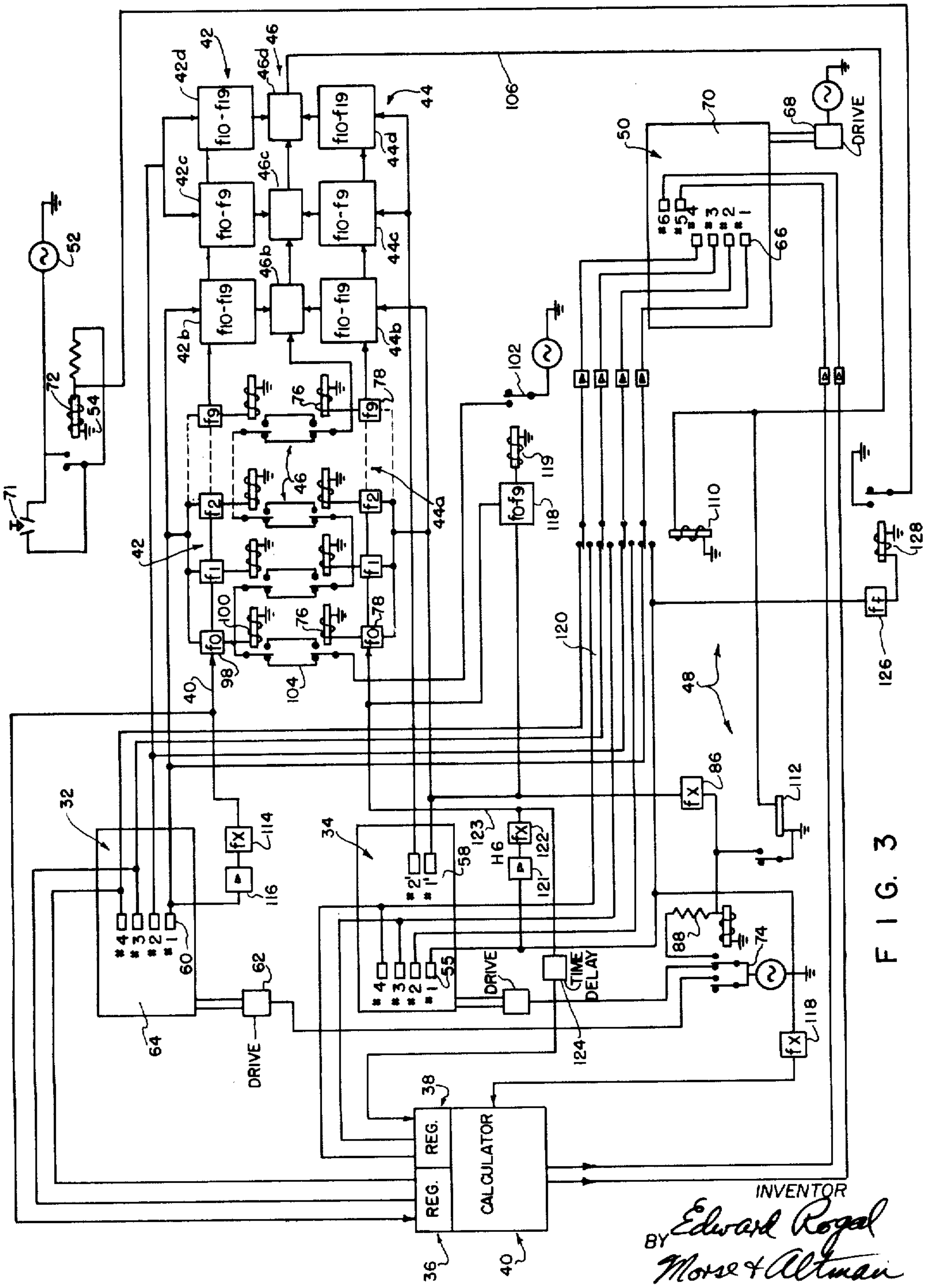
FIG. 3 is a schematic diagram illustrating details of the block diagram of FIG. 2.

The schematic diagram of FIG. 3 bears a general spacial correspondence to the block diagram of FIG. 2. For clarity, power is shown being applied between a source 52 and ground 54. As shown in FIG. 3, source station 34 includes a plurality of transducers 55, designated #1, #2, #3, #4, #1′ and #2′ and a drive 56 for controlling the longitudinal position of an elongated tape 58. Source station 32 includes a plurality of transducers 60, designated #1, #2, #3 and #4, and a drive 62 for controlling the longitudinal position of an elongated tape 64. Summary station 50 includes a plurality of transducers 66, designated #1, #2, #3, #4, #5 and #6, and a drive 68 for controlling the longitudinal position of an elongated tape 70. The operation of source stations 32 and 34 and summary station 50 is controlled by registers 42 and 44, comparator 46, registers 36 and 38, calculator 40 and gate 48 in a manner now to be described in detail.

The operation of the system of FIG. 3 is initiated by a start button 71 that closes a relay 72 for the purpose of distributing power to appropriate points. Initially power is applied to drive 56 of source station 34 for the purpose of advancing tape 58, the power being applied through a relay 74. Tape 58 advances until the address increments of its first block are read by transducers #1′ and #2′. The four address frequencies of these two address increments respectively are entered in four components *a, b, c* and *d* of register 44. Each of these components includes selected relays 76, which are energized through associated filters 78. Filters 78 are responsive to the selected frequencies transmitted from transducers #1 and #2 of source station 34. Although only component 44*a* has been shown in detail, it will be understood that the remaining three components 44*b, c* and *d* are similarly operable. Moreover specifically: one of the frequencies ($f_0$–$f_9$) of the first address increment energizes one of relays 76 of component 44*a* and the other of the frequencies ($f_{10}$–$f_{19}$) of the first address increment energizes one of the analogous relays of component 44*b*; and one of the frequencies ($f_0$–$f_9$) of the second address increment energizes one of the analogous relays of component 44*c* and the other of the frequencies ($f_{10}$–$f_{19}$) energizes one of the analogous relays of component 44*d*. When transducer #1′ of source station 34 detects the control pulse ($fx$) following the first block, a filter 86 energizes relay 74, which locks in response to current through a resistor 88. In consequence: the current through relay 74 to drive 56 is cut off so that drive 56 is deactuated; and the current through relay 74 to drive 62 is applied so that drive 62 is actuated.

Source station 32 now transmits signals from its transducers #1 and #2 into register 42 and its transducers #3 and #4 into register 36. Register 42 includes four components *a, b, c* and *d* that are similar to components *a, b, c* and *d* of register 44, described in detail above. The components of register 42 are interconnected by components *a, b, c* and *d* of comparator 46. Details of register component 42*a* and of comparator component 46*a* are shown in association with details of register component 44*a*.

Each of comparator components 46*a, b, c* and *d* is in the form of a "neither-or-both" network operating as follows. Each of the filters of register component 42*a*, as shown at 98, is associated with a relay 100 that operates when an appropriate frequency is transmitted. The operation of comparator 46 is such that when the frequencies applied to components 44*a, b, c* and *d* correspond, respectively, to the frequencies applied to components 46*a, b, c* and *d*, current will flow through a relay 102 and interconnections 104 via a lead 106 to a relay 110 and a relay 112. Relays 110 and 112 are components of gate 48, which in this case permits signals to be transmitted to summary station 50. In the event that no comparison occurs between registers 42 and 44, a block control pulse ($fx$) will be applied by an amplifier 116 to a filter 114, which transmits a clear pulse to registers 42 and 36 in order to permit the reception of signals from the next block. In this case relays 110 and 112 do not operate and gate 48 remains closed.

The remainder of the operation is such that a filter 118 and an associated relay 119 serve to prevent the operation of relays 110 and 112 and registers 42 and 44, when they are not receiving address signals. Relay 118 is operated by any frequency ($f_0$–$f_9$) from transducer #1 of source station 34. On the other hand, when the address signals received by registers 42 and 44 are the same, relays 110 and 112 are permitted to operate. Relay 110 is capable of switching the inputs of summary station 50 from the transducers of source station 32 to the transducers of source station 58 through suitable leads 120. Relay 112 shunts the winding of relay 74 to ground in order to release it. In consequence, current to drive 62 is cut off and current to drive 56 is applied. At this point the address increments which had been read by transducers #1′ and #2′ of source station 34 now are read by transducers #1 and #2 and the address and data increments are re-recorded through transfer relay 110 onto tape 70.

When the control increment ($fx$) is read by transducer #1 of source station 34, a signal is transmitted through filter 118 for the purpose of directing the calculator to process, e.g., to add the two sets of data set up in registers 36 and 38. The signal representing the result is applied by calculator 40 to transducers #5 and #6 of summary station 50. Transducers #5 and #6 are offset with respect to transducers #1, #2, #3 and #4 for the purpose of compensating for the time lag in the operation of the calculator. The spacing is such that the result will appear on the same line as the record of the signals from source station 34 as applied by transducers #1, #2, #3 and #4. The block control increment ($fx$), as it is read by transducer #1 of source station 34, also generates a signal for transmission through an amplifier 121 and a filter 122 to register 44 through line 123 and to register 38 through a time delay relay 122 in order to clear registers 44 and 38 for reception of signals generated by the next block. Time delay relay 124 compensates for the operating time of the calculator. When register 44 is cleared, relay 118 is deenergized to cut off the current through line 106 to relays 110 and 112.

Thereafter, source station 34 operates until the next address is entered in register 44 and the next block control increment is detected by filter 86. In consequence, relay 74 closes, drive 56 is deactuated and auxiliary source station 32 is reactuated. Since relay 110 is released, source station 32 continues to re-record its address and data increments in their respective registers until an equality again appears. It is apparent that this operation is repetitive and automatic, continuing until all corresponding blocks on source tapes 58 and 64 are collated into groups on summary tape 50. When reference source tape 58 has been advanced completely through source station 34, the tape control increment ($f_t$) is detected by a filter 126 which actuates an associated relay 128 in order to cut off relay 72 and to halt the operation.

It will be understood that although the foregoing system has been described for simplicity in conjunction with four primary data channels, the system is adapted for use in conjunction with any practical number of channels without departing from the basic control philosophy illustrated. Although calculator 40 has been discussed as a simple adding machine, other operations including subtraction, addition, multiplication, division, etc. may be effected similarly. Also, calculator 40 may be operated so as to produce on summary tape 70 sub-totals and grand totals.

Since certain changes may be made in the above system without departing from the scope of the invention herein involved, it is intended that all matter contained in the above description or shown in the accompanying drawings shall be interpreted in an illustrative and not in a limiting sense.

What is claimed is:

1. A data processing system for collating separate source data into combined summary data, said system comprising a plurality of source stations for producing source signals corresponding to a plurality of source records, a first plurality of registers and calculator means for receiving signals from said source stations and performing calculations thereon in order to produce result signals, a second plurality of registers and a comparator for permitting said first plurality of registers and said calculator means to operate after receiving certain source signals from said plurality of source stations, and a gate for permitting the passage of said source signals from said source stations and said result signals from said calculator in response to said signals from said comparator, whereby a summary station may produce a summary record representing signals transmitted through said gate.

2. The system of claim 1 wherein said signals are in the form of selected combinations of frequencies.

3. The system of claim 1 wherein said source records are in the form of magnetic tape and said source stations include electromagnetic transducers.

4. A data processing system for collating separate source data into combined summary data, said system comprising a plurality of source stations for producing source signals corresponding to a plurality of source records, a first plurality of registers and calculating means for receiving signals from said source stations and performing calculations thereon in order to produce result signals, a second plurality of registers and a comparator for permitting said first plurality of registers and said calculator means to operate after receiving certain source signals from said plurality of source stations, and a gate for permitting the passage of said source signals from said source stations and said result signals from said calculator in response to said signals from said comparator, whereby a summary station may produce a summary record representing signals transmitted through said gate, said signals being in the form of selected combinations of frequencies, said source records being in the form of magnetic tape and said source stations including electromagnetic transducers.

References Cited in the file of this patent

UNITED STATES PATENTS 2,580,768 Hamilton et al. ---------- Jan. 1, 1952
2,604,262 Phelps et al. ---------- July 22, 1952